June 4, 1957 A. H. FAULKNER 2,794,976

IMPULSE SENDERS

Filed Dec. 30, 1952 3 Sheets-Sheet 1

INVENTOR.
ALFRED H. FAULKNER

BY [signature]

ATTY.

June 4, 1957 A. H. FAULKNER 2,794,976

IMPULSE SENDERS

Filed Dec. 30, 1952 3 Sheets-Sheet 2

INVENTOR.
ALFRED H. FAULKNER

BY Wm Walter Owen

ATTY.

June 4, 1957 A. H. FAULKNER 2,794,976

IMPULSE SENDERS

Filed Dec. 30, 1952 3 Sheets-Sheet 3

INVENTOR.
ALFRED H. FAULKNER

BY Mc Watters Owen

ATTY.

2,794,976
Patented June 4, 1957

2,794,976

IMPULSE SENDERS

Alfred H. Faulkner, Chicago, Ill., assignor to General Telephone Laboratories, Incorporated, a corporation of Delaware Application December 30, 1952, Serial No. 328,787
19 Claims. (Cl. 340—359)

The present invention relates in general to impulse senders and particularly to an improved electronic key sender.

Key senders find their most general use in the communication fields and more particularly in telephone communication wherein it is desirable to transmit information, such as a series of digits over a line for operating or selecting various equipment. This is accomplished by an operator who has a keyset available comprising a number of keys representing digits and which she operates to mark certain leads corresponding to the digit key operated. Where many operators must utilize in a limited number of storage and impulsing equipment, a sender control circuit is provided for the purpose of associating idle registration or storing equipment and impulse equipment with the particular operator's keyset and for providing certain other control functions. In the past key sender storing and impulsing equipment made use of relays and stepping switches for storing digits and counting impulses. Recently in accordance with the advances made in the electronic arts, various electronic key senders have been devised utilizing condensers or neon tubes for the registration and storage of digital information and electronic counting circuits for controlling and counting the number of impulses transmitted. The condenser arrangements have been unreliable due to the fact that particular potentials are used corresponding to particular information registered and the potentials are subject to variation in accordance with the variations in source potential and leakage from the condensers to thereby prevent accurate transfer of the stored information, while the neon tube arrangement is both expensive and subject to the difficulty of securing proper voltage changes to insure the transfer of stored information to the electronic counting circuits.

The present invention utilizes a ten digit key sender requiring a minimum of contact springs on the keyset to mark the leads to the registration and storage equipment. This is made possible by the use of rectifiers associated with certain leads and keys and a binary electronic counter arranged to count to twelve instead of the customary sixteen. In one embodiment of the invention each lead is connected sequentially on successive operation of the keyset keys to a series of individual condensers through successive contacts of a rotary switch level individual to each lead for sequentially registering or storing a number of digits and each marked lead places a marking on its corresponding condenser. The mark placed on the condensers associated with the first contacts of each rotary switch level is transmitted through a corresponding contact of a corresponding level of another rotary switch to set an electronic counting circuit to a condition corresponding to the first digit. In the meantime the first rotary switch is advanced so that a second digit may be registered in condensers individually associated with the second bank contacts of each level of the rotary switch. As the second bank contact of the second rotary switch is not connected to that condenser until the first digit has been sent and the first rotary switch continually advances after each digit is stored, the condensers associated with any particular bank contact are completely isolated except when their charge is transferred to the electronic counting circuit and little possibility exists for the charge on the condenser to leak sufficiently to upset the operation of the equipment. In the other embodiment of the present invention tubes are utilized in place of condensers between each of the corresponding contacts of each level of the rotary switch and they are fired in accordance with the marking placed on the keyset leads.

The electronic counting circuit is arranged to count to twelve and each digit is registered in the counting circuit as twelve minus the particular number desired to be transmitted. An impulser is set in operation as soon as the digit is registered in the counting circuit and it transmits pulses to operate the desired equipment and simultaneously transmits pulses to the counting circuit to advance the counting circuit to twelve after which the impulse is disabled so that only the proper number of impulses are sent and the second rotary switch is advanced to register the next stored digit in the counting circuit.

One object of the present invention is a circuit arrangement for securing more faultless and reliable operations in an electronic key sender.

Another object is the reliable registration of information by utilizing condensers or tubes in an electronic key sender.

Another object is the elimination of critical voltage and current requirements for the accurate operation of an electronic keysender.

Still another object is the reduction in the amount of equipment necessary in a keysender to thereby secure a reduction in manufacturing cost.

Still another object is a simplified structure and parts to thereby reduce and eliminate repairs and upkeep.

One feature of the present invention is the novel means for registering digits in one case by charging condensers corresponding to the digit to be registered and in the other case operating tubes corresponding to the digit.

Another feature is the rectifier arrangement in the keyset for reducing the number of leads necessary to register digits.

Another feature is the novel circuit arrangement for securing accurate registration.

Other features are the circuit arrangements and devices for eliminating critical operating values for the various elements of this apparatus without resulting in faulty operations.

Still another feature is the circuit arrangement for counting impulses.

Other circuit features include an arrangement whereby impulses corresponding to the remaining registered digits will continue to be sent after the operator has finished the registration of digits.

Other objects, features and adaptations of this invention will appear on further reading of the specification together with the accompanying drawings though the several embodiments of the invention appearing herein are designed generally for use with telephone switchboards in a telephone system.

One embodiment of the invention uses condenser registration of digits and heated cathode thyratron tubes such as 5696, 2050 or 502A for counting impulses, while the other uses cold cathode thyratron glow tubes for registration and counting of impulses. The heated cathode tubes will generally operate if the control grid potential exceed −1 or −2 volts with respect to the cathode.

Either of the two embodiments of the impulse senders may be seized over a sender control circuit by an operator who desires to register and send digits. In the first embodiment on receiving a signal in any well-known manner that the impulse sender has been seized the operator may then press the keys corresponding to the particular digits which she desires to send. The key which the operator presses marks a corresponding lead or leads from her keyset extending through the first contacts of a four level rotary switch in the impulse sender to charge one or more of a series of condensers each connected to the first contact of each level of the switch and corresponding to the key pressed. The switch is rotated to its next contact on release of the operator's key so that she may register the next digit on a similar series of condensers and proceed to register the following digits in the same manner. After registering the desired number of digits the operator would then press her disconnect key (not shown) for disconnecting her keyset from the impulse sender. In the second embodiment of the invention, instead of charging a condenser for registration, cold cathode thyratron tubes would be fired in accordance with the particular key pressed.

Either of the described embodiments provides an economical, accurate means of registration. Elimination of registration by means of relays and the attendant cost together with the necessity of constant supervision represents in itself a substantial saving. It should be noted at this point that the charges placed upon the condensers are of the same value for each condenser whereas previous systems had varied the charge on the condenser in accordance with the particular digit to be registered. This last method necessitated critical and accurate charging of the condensers, and as the condenser charges are subject to varying charging voltages and circuit conditions faulty operation was frequent. In the present system it is not necessary to distinguish in the size of the charge on each condenser but only necessary that the charge be high enough to operate the tube associated with the particular condenser. This condition is easily accomplished in the present invention as further reading of the specification will disclose.

A binary electronic counting system which can easily be stopped on the count of twelve is used in both embodiments of the invention. Therefore a lead or leads from the keyset will be marked on depression of a key, which leads will correspond in number to twelve minus the value of the depressed key. This number will be referred to in this specification as the complement of twelve. To illustrate, of the four marking leads extending from the keyset; lead A will have the value of 1; lead B, the value of 2; lead C the value of 4; and lead D the value of 8 so that they correspond to the binary series 1, 2, 4, 8 . . . The keyset contacts are connected to leads A through D and to the rectifiers M and F in such a manner that depression of a key marks the leads having a total value equal to twelve minus the digit value of the depressed key. Thus if key 1 is pressed leads A, B and D totaling 1+2+8 or 11 will be marked. Similarly if key 0 is pressed only lead B corresponding to 2 is marked. These markings will be registered and will cause the operation of certain corresponding tubes in the counting system which will thereby set the system at a value corresponding to the complement. Thus the sending of impulses will be halted on the count of twelve minus the complement of the value of the depressed key to thereby send only a number of impulses corresponding to the depressed key.

As previously mentioned a binary electronic counting system which stops on the count of twelve is used in the impulse sender described herein. A simpler impulse sender could be constructed with a counting system which stops at the count of sixteen but this would necessitate the marking of leads corresponding to sixteen minus the digit value of the depressed key which is undesirable because of the large increase in the number of contacts that would be required on the keyset.

The counting circuit itself comprises four stages of electron tubes; the first three stages each comprising a pair of tubes. Each stage operates once for two operations of the stage immediately preceding it so that in order to operate the last stage the preceding stage must operate twice, the next stage four times and the first stage eight times. Each of the first three stages have one initially operated tube and one initially unoperated counterpart tube. To illustrate the operation assume that a count of twelve is to be made; on the first count the unoperated tube of the first stage is operated and the initially operated tube extinguished; on the next count this procedure is reversed but the second tube on being extinguished operates the unoperated counterpart tube of the second stage which in turn extinguishes the operated tube of the second stage; the third count reverses the second condition of stage one, the fourth count reverses the third condition of stage one which in turn reverses the existing condition of stage two to thereby reoperate the initially extinguished tube and extinguish the counterpart tube, the counterpart tube on being extinguished causes the operation of the counterpart tube of stage three and the extinguishment of the initially operated tube in the third stage. The fifth count reverses the fourth condition of stage one so that the initially operated tube is now unoperated and the counterpart tube is operated. The sixth count reverses the fifth condition of the first stage and the condition of the second stage existing at the end of the fourth count. The seventh count reverses the sixth condition of the first stage. The eighth count reverses the seventh condition of the first stage and in turn the initially operated tube of the second stage is operated and its counterpart tube extinguished to in turn operate the initially operated tube of the third stage and extinguish its counterpart which in turn operates the tube of the fourth stage. This last tube, in the fourth stage, which operated on the count of eight now prepares a circuit for the operation of another tube to be operated on the count of twelve. The count nine reverses the eighth condition of the first stage. The count ten reverses the ninth condition of the first stage and condition of the second stage existing at the end of the eighth count. The eleventh count reverses the tenth condition of stage one. The twelfth count reverses the eleventh condition of stage one, causes the reversal of the condition of stage two existing at the end of the tenth count and the reversal of the condition of stage three existing at the end of the eighth count. Reversal of stage three at this time results in the extinguishment of its initially operated tube and the operation of its counterpart tube. Extinguishment of the initially operated tube of stage three now results in the operation of a tube whose circuit was prepared by the operation of the tube of the fourth stage on the count of eight. This tube now operating on the count of twelve now closes a circuit which will terminate the pulsing operation.

Several characteristics of this counting system should be noted. If the initially operated tubes of the first three stages only are operated the system is at 0 and it may count to twelve, however as at the most it will be desirable to send only ten impulses over the line the counting system must be set at a value of two or more. Therefore any leads marked by a depressed key in the keyset correspond to twelve minus the value of the depressed key. These markings may be registered or stored and then be used for the purpose of operating corresponding ones of the counterpart tubes to thus set the counting chain. On any odd number the initially operated tube of the first stage was extinguished while its counterpart was operated and the opposite true of any even number. On the count of two or any multiple of two except four, eight and twelve the counterpart tube of stage two is operated while its initially operated tube is unoperated and the opposite true on counts four, eight and twelve. On the count of four and until the count of eight the initially operated tube of stage three is extinguished and its counterpart operated. On the count of eight and until the count of twelve this condition of stage three is reversed and stage four is operated to prepare a circuit for a tube to be operated on the count of twelve. Stage four remains operated from the count of eight until the count is ended. On the count of twelve stage three reverses its condition so that it is now as it was from the count of four until the count of eight. Simultaneously the tube whose circuit was prepared by stage four is operated and all pulsing halted. It should now be clear that each reversal of stage one is equivalent to one count. Each reversal of the second stage adds two to the count. Each reversal of stage three adds four to the count and the operation of stage four is equivalent to a count of eight. Thus operation of any of the counterpart tubes of the first three stages or the tube of stage four by marking corresponding leads from the keyset results in setting the system at the additive value of any of the operated counterpart or stage four tubes. To secure the count of nine for example the stage one counterpart tube would be operated and the stage four tube would be operated. The count of eleven is secured by pressing key 1 to operate the counterpart tubes of stages one and two and the tube of stage four.

On seizure of the impulse sender the described initially operated tubes of the various stages of the counting system in the impulse sender would be operated. After the operator has registered the desired digit each of the registered markings would be placed on the first contact of another four level rotary switch, and from there be used to operate a certain tube or tubes corresponding to the marked contact or contacts and thereby extinguish certain of said initially operated tubes of the first fired group to thereby set the counting system at the value of twelve minus the complement of the number of the depressed key. A circuit will be closed shortly thereafter for sending pulses out over a line and providing input pulses for the counting operation. On each pulse a condenser will discharge to send a pulse into the counting circuit and operate certain of the tubes to advance the count. The counting operation will halt the sending of impulses over the line as soon as the number of impulses corresponding to the key pressed by the operator have been sent. The second four level rotary switch is then stepped to its next contact, the appropriate ones of which being marked, the impulses may again be sent corresponding to the next digit that has been registered by the operator.

The operator might register varying numbers of digits or after having registered one set of digits she may desire to seize another impulse sender and therefore the first impulse sender must continue to function after the operator has stopped registering. Therefore after the operator has set up all of the digits of a desired number, the disconnect key (not shown) is operated for disassociating the operator's keyset from the sender control circuit and the impulse sender in any well known manner, while the impulse sender holds the sender control circuit in any well known manner until all of the digits have been sent after which the impulse sender will be disassociated from the sender control circuit and the impulse sender is returned to normal. This feature although applicable to both embodiments of the invention will be described in connection with the second embodiment.

Referring now to the drawings, Fig. 1 is a keyset used by the operator in the first embodiment of this invention.

Figure 3:
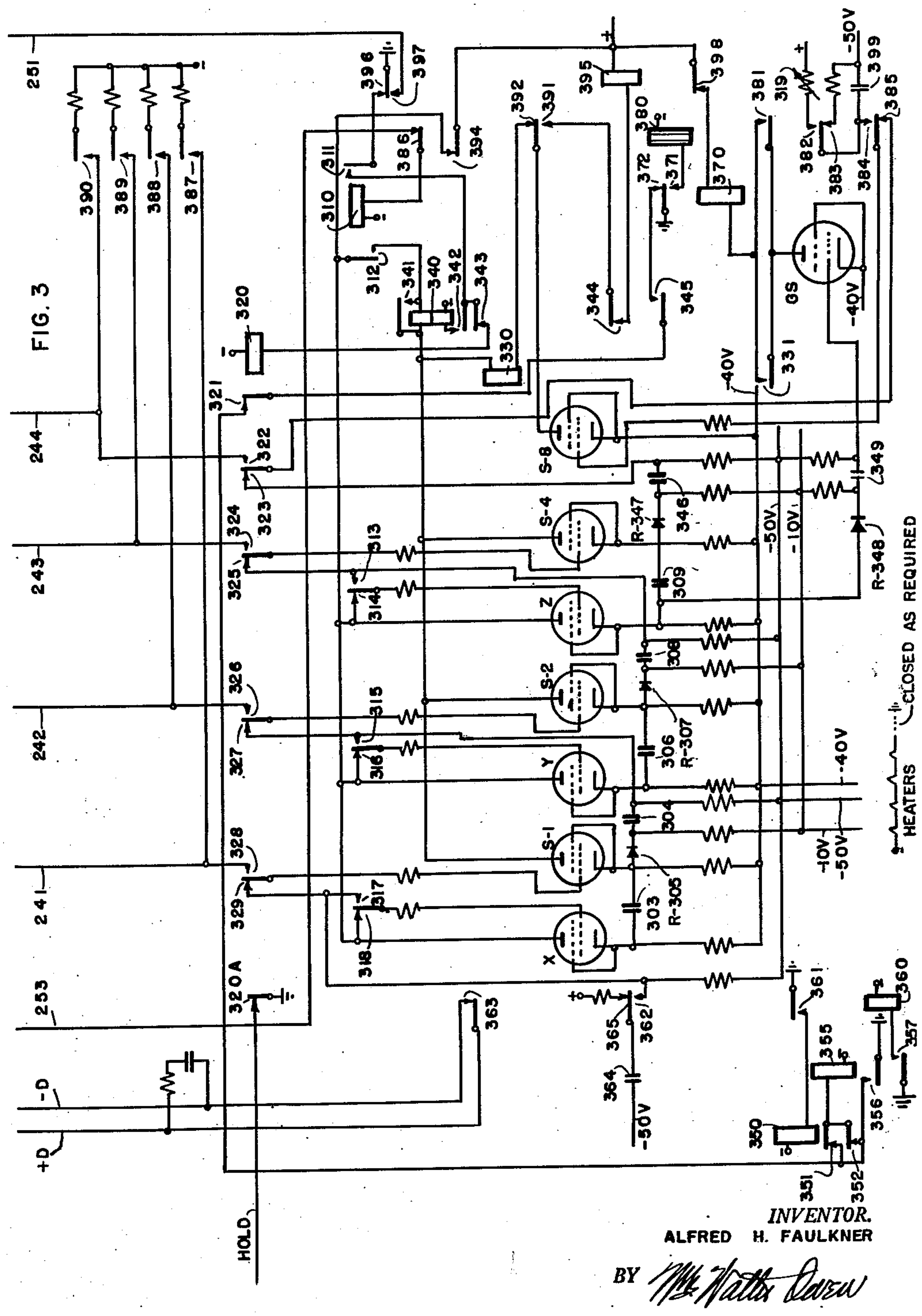
Fig. 3 is the novel counting circuit which may be used with either embodiment of the invention and is here discussed in conjunction with the first embodiment.
Figures 1, 2:
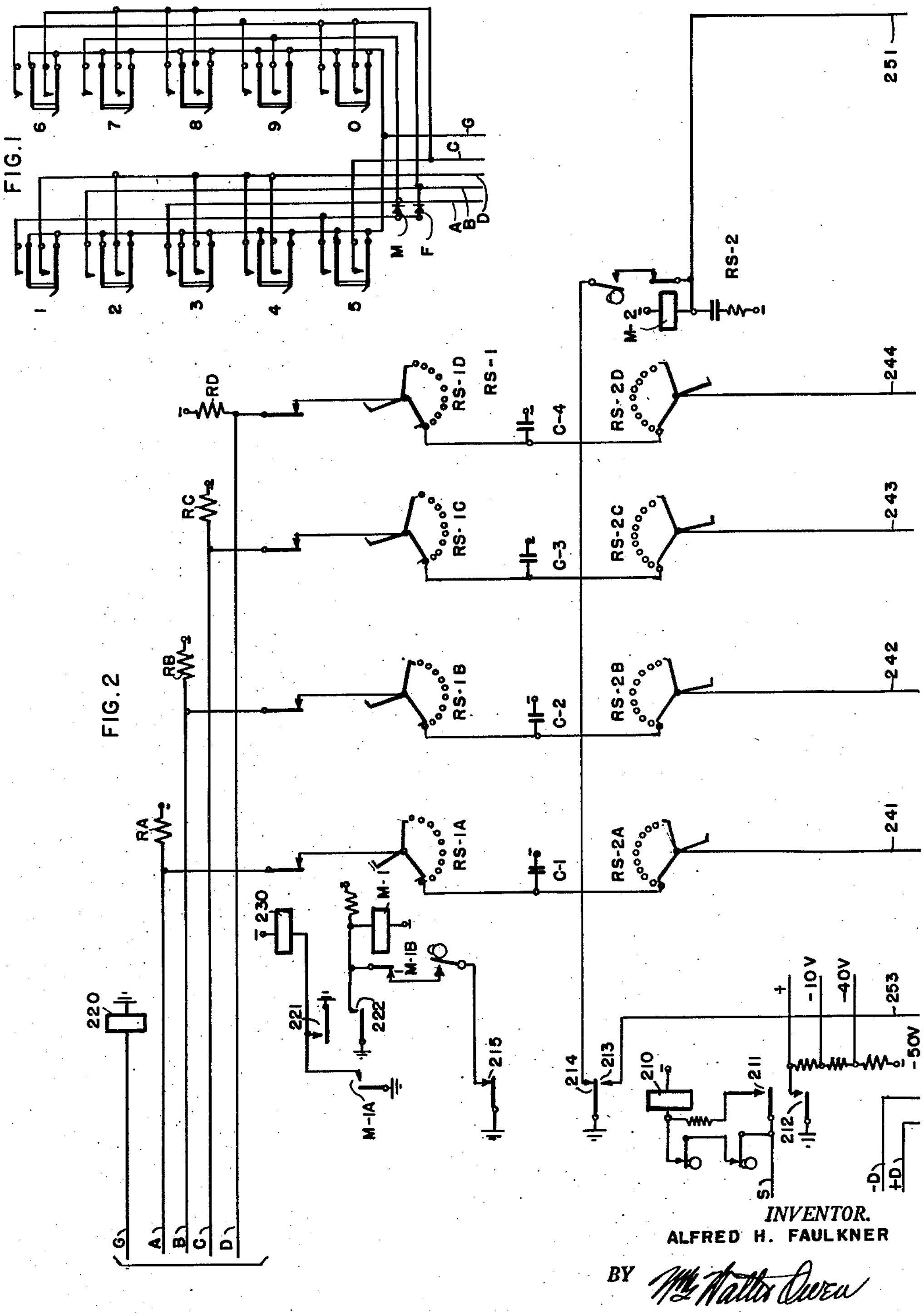
Fig. 2 is the condenser circuit arrangement for registering the digits used in the first embodiment of the invention.
Figures 4, 5, 6:
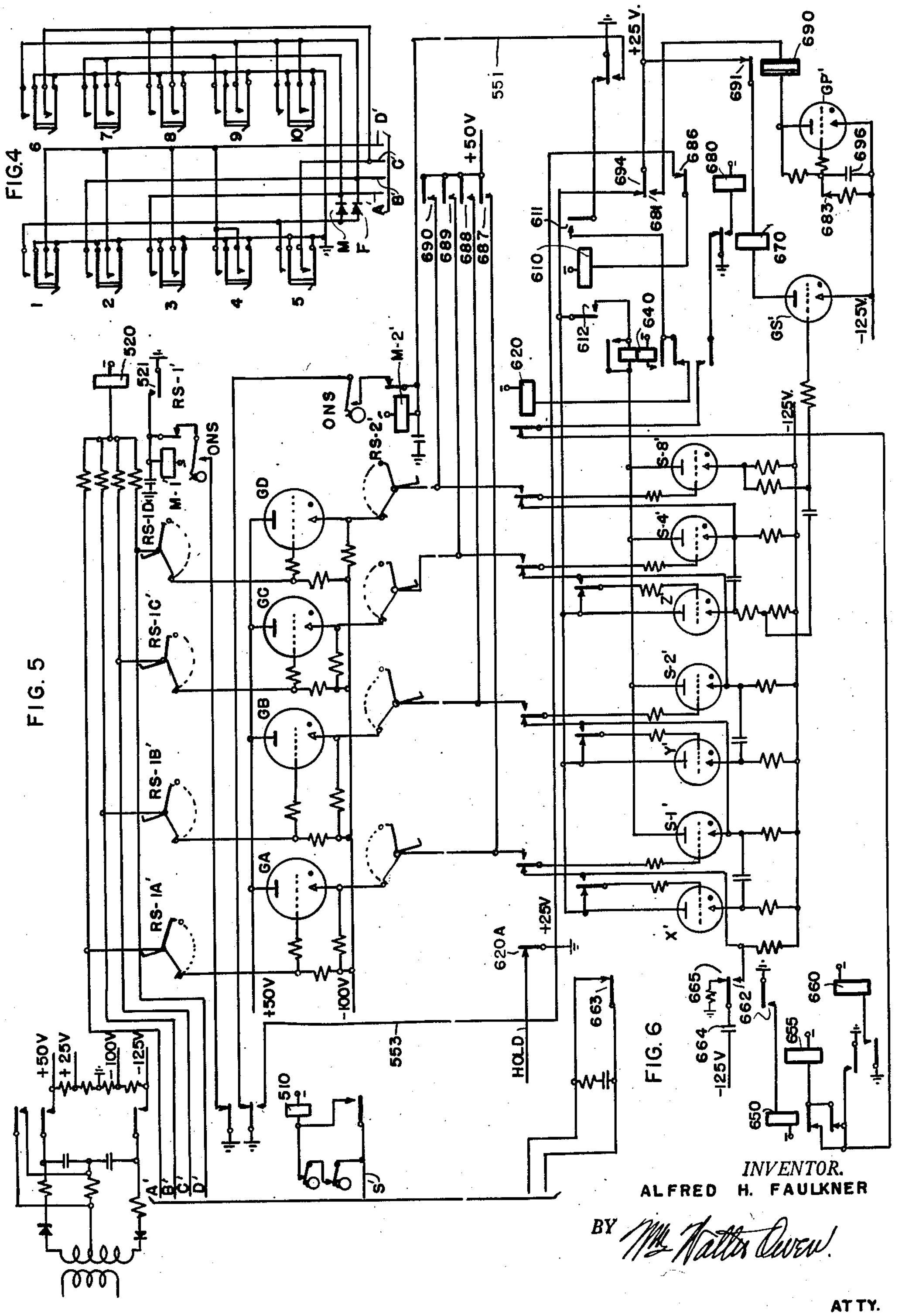

Figs. 4, 5 and 6 comprise the second embodiment of the invention and correspond with Figs. 1, 2 and 3, respectively.

The discussion will now proceed with a detailed description of the first embodiment of the invention. As before mentioned the impulse sender would be seized in any well known manner from a sender control circuit which would ground the lead S shown in Fig. 2 to complete an obvious circuit for operating relay 210. Relay 210 on operating closes contacts 211, 212 and 213 and opens contacts 214 and 215. The closing of contacts 211 completes a holding circuit for relay 210. Contacts 212 operate the power supply and as the + lead is connected to the anodes and grids of tubes X, Y and Z while the −40 volt supply is connected to their cathodes these tubes operate. Contacts 213 operate relay 310 in Fig. 3 as follows: ground, conductor 253, contacts 386, winding of relay 310 to battery. Relay 310 operates and closes contacts 311, 312, 313, 315 and 317. Contacts 312 connects the + lead of the power supply to the anodes of tubes S–1, S–2 and S–4 through the upper winding of relay 340, however these tubes do not fire as their grids are connected to the −50 volt supply. Contacts 311 on closing complete the following circuit for operating relay 320: ground, contacts 396, contacts 311, contacts 343, winding of relay 320 to battery. Relay 320 opens contacts 321 and closes contacts 322, 324, 326 and 328. Relay 320 also opens contacts 320A whose function is to hold the sender control circuit until all digits have been sent. Its operation will be described in connection with the second embodiment of the invention. The closing of these latter contacts prepares the grid of each of the tubes associated therewith for marking by key operated in the operator's keyset.

The operator on being signalled in any well known manner, that an impulse sender was seized would now press one of her digit keys for charging or marking a corresponding condenser or condensers connected to the first contact of any of the four levels of RS–1. In this example the number 3 will be registered and therefore the operator will press the key number 3 to close the following circuits: battery, resistor RD, lead D to the second contact of key 3, lead G, winding of relay 220 to ground; battery, resistor RA, lead A, the first contact of key 3, lead G, winding of relay 220 to ground. The battery connected to the resistor should be of a value of −50 volts and the battery connected to condensers C–1—C–4 also be of approximately the same value. The closing of the aforementioned circuits will charge condensers C–1 and C–4 to a value of around −10 volts depending on the values of resistors RD and RA and the resistance of the winding of relay 220. The charge on condensers although subject to some leakage will not fall below a value of −40 volts which is the minimum necessary to energize the grid of the appropriate tube. Resistors RA and RD should be of values low enough to secure the operation of relay 220. Relay 220 operates and closes contacts 221 and 222. The closing of contacts 221 completes an obvious circuit for relay 230 which operates and opens contacts 231—234 and prevents charges placed on any condensers such as C–1 and C–4 from leaking off. Closing of contacts 222 energizes M–1 which opens contacts M–1B and closes contact M–1A. Closing of contacts M–1A completes an obvious holding circuit for relay 230. M–1 does not step RS–1 until the operator releases her key so that relay 220 will restore and open contact 222. M–1 on deenergization will then step RS–1 to its next contact so that the operator may register another digit. Condensers C–1 and C–4 will mark the first contact of RS–2A and RS–2D to an initial value not less than −10 volts which marking will in turn be applied over conductors 241 and 244 respectively to the grid of counterpart tube S–1 of stage one and the grid of tube S–8 of stage four and these tubes will now operate as their grid potential has been raised from −50 volts to a value of not less than −40 volts. The operation of tubes S–1 and S–8 sets the counting circuit at 9 so that three pulses may be sent before the count of twelve is attained and the pulsing halted. The flow of current in the anode circuits of these tubes will operate the upper winding of relay 340 which winding will short itself at contacts 341. However, a holding circuit for the lower winding of relay 340 will now be energized as follows: battery, contacts 342, contacts 311, contacts 396 to ground. Relay 340 will also open contacts 343 and 344 and close contacts 345. Contacts 343 on opening break the circuit to relay 320 and it restores. Contacts 345 on closing prepare a circuit to the pulsing relays 350, 355 and 360. Relay 320 on restoring close contacts 321, 322, 325, 327 and 329. At contacts 321 a circuit is completed to one of the pulsing relays 355 to be described.

In the meantime the operation of thyratron S–1 causes initially operated thyratron X to halt operation due to the capacitor 303 coupling their cathode circuits. Firing of S–1 raises its cathode potential from −40 volts to −10 volts. This characteristic is true of tubes X, Y, Z, S–2, S–4, S–8 and GS in this embodiment of the invention. The germanium diode rectifier R–305 is prevented from passing current, however by the −10 volt charge applied to its opposing side from the power supply. Tube S–8 on operating over an obvious circuit through contacts 392 operates relay 330 which closes contact 331 to prepare tube GS for later operation. As mentioned, contacts 321 had closed the following circuit to operate relay 355: ground, contacts 372, contacts 345, contacts 321, contacts 351, winding of relay 355 to battery. Relay 355 closes contacts 356 for a temporary holding circuit and contacts 357 to operate relay 360. Relay 360 on operating closes contacts 361 to operate relay 350 which opens the circuit to relay 355 which in turn opens the circuit to relay 360 and causes it to drop back. Relay 360 had also opened contacts 363 and when restoring it closed these contacts to send a pulse over the line. It had also opened contacts 365 and closed contacts 362 to thus allow condenser 364 to discharge. The resistors in series with the grids of the tubes are of high value as compared to the common resistor in the −50 volt supply thus keeping the grid of tube X at a value of about −50 volts and preventing operation of tube X until condenser 364 on discharging raises the grid potential of tube X to a positive value with respect to its cathode to thereby cause tube X to operate. Tube X operates and extinguishes tube S–1. In doing so it drives the cathode of tube S–1 to a value of +20 volts and thereby causes rectifier R–305 to become briefly conductive. During this brief interval, when the rectifier becomes conductive the control grid of tube S–2 swings from −50 volts to −20 volts to thereby cause tube S–2 to become conductive. Tube S–2 on operating causes tube Y to extinguish due to the capacitor C–306 coupling their cathode circuits. Rectifier R–307 prevents the passage of current from the cathode of tube S–2 as both sides of the rectifier are at a value of approximately −10 volts. The count has now advanced from 9 to 10.

Returning for an instant to the pulsing circuit it will be remembered that when relay 360 had operated it had closed contacts 361 to operate relay 350 which in turn had opened the circuit to relay 355 which in turn opens the circuit to relay 360 causing relay 350 to release and causes relay 355 to reoperate to in turn operate relay 360 and repeat the aforementioned operations at its various contacts. Condenser 364 on discharge at this time operates tube S–1 in the same manner as it had operated tube X on the previous pulse. Operation of tube S–1 extinguishes tube X and the count advances to eleven. The pulsing relays repeat their operation and condenser 364 on discharging on the third operation of relay 360 now operates tube X which in turn extinguishes tube S–1 and instantaneously raises the cathode potential on tube S–1 cause rectifier R–305 to pass current and raise the grid potential of tube Y to a sufficiently positive value to cause tube Y to operate in the same manner as tube S–2 was operated. Tube Y on operating extinguishes tube S–2 and instantaneously raises the cathode potential of tube S–2 from its operating value of approximately −10 volts to a value in the neighborhood of +20 volts to thereby cause rectifier R–307 to pass current in the same manner as rectifier R–305 and cause tube S–4 to operate in the same manner as tube S–2 operated previously. Tube S–4 on operating extinguishes tube Z due to the capacitor 309 coupling their cathode circuits. The cathode of tube Z on extinguishing swings to a positive value to pass current through rectifier R–348 and operate GS in the same manner as tube S–2 operated previously. Tube GS cannot operate until after S–8 operates which will occur only when the count has reached the value of eight. Tube GS on operating operates relay 370 which opens contacts 372 and closes contact 371. Contact 372 on opening breaks the circuit to the pulsing relays and thus halts their operation at the end of the third pulse or on the count of twelve. At contacts 371 it closes an obvious circuit for operating relay 380. Relay 380 on operating closes contacts 381, 382, 384, 387, 388, 389, 390 and 391 and opens contacts 383, 385, 386, 392 and 394. Contacts 387, 388, 389 and 390 on closing shunt condensers C–1—C–4 to erase any charges on these condensers. Contacts 394 on opening opens the anode circuits of all the counting tubes and any operated ones are extinguished. Opening of contacts 386 restores relay 310 and thereby opens another point in the anode power supply to tubes S–1, S–2 and S–4. At contacts 392 another point is opened in the anode circuit of tube S–8 and the circuit is broken to relay 330 and relay 330 restores releasing contact 331; however tube GS continues to operate as contacts 381 closed when relay 380 operated to thereby provide an alternate anode circuit before contacts 331 are opened. Relay 340 restored when relay 310 released and it closed contacts 344 to thereby again complete an anode power supply for tube S–8 through relay 395. Tube S–8 however was deionized while contacts 394 were opened and during the release time of relay 340 and as tube S–8 is not operated relay 395 does not operate now. Relay 380 on closing contacts 384 and 382 connects the grid of tube S–8 to a timing circuit. The condenser 399 charges through the adjustable resistor 319 to thereby raise the potential of the grid of tube S–8 at a rate determined by the desired duration of the inter-digital pause. When the charging of condenser 399 has progressed sufficiently, tube S–8 operates and causes relay 395 to operate. Relay 395 opens contacts 396 and 398 and closes 397. Opening of contacts 398 causes tube GS to extinguish and relay 370 to release to in turn cause the release of relay 380. At contacts 397 the following circuit is completed to energize motor magnet M–2 of rotary switch RS–2: ground, contacts 397, conductor 251, M–2 battery. Release of relay 380 opens contacts 391 and close contacts 392 to thereby open the anode circuit of tube S–8 and extinguish it. Opening of the anode circuit of tube S–8 causes relay 395 to release and open contacts 397 to thereby cause the release of M–2 which now steps rotary switch RS–2 on deenergization to its second contact so that the impulse sender may send impulses corresponding to the markings placed on any of the condensers one of which connected to the second contact each of the four levels of RS–1.

The second embodiment of the invention employs cold cathode tubes throughout the operation both for registering and counting. It employs a keyset which secures the ground directly at the operator's key instead of through a relay as done in the previous embodiment. The marking leads correspond to those used in the previous embodiment. The impulse sender would be seized in the same manner as described in the first embodiment and relay 510 in Fig. 5 would be operated in the same manner as relay 210 had been operated previously. Relay 510 on operating would operate the power supply which in turn would operate tubes X', Y' and Z'. All tubes employed in this second embodiment are operated whenever the grid is raised to a value of approximately 85 volts positive with respect to the cathode and during operation the cathode is at a value of approximately —75 volts with respect to the anode. As the anode is approximately 50 volts positive the cathode is in the neighborhood of 25 volts negative when the tube is operated.

The operator on receiving a signal in any well known manner that the impulse sender had been seized would now press a key corresponding to the digit that she desires to register which in this example will be key 9. Depression of key 9 places ground on leads A' and B' being the complement of twelve and corresponding to leads A and B of the previous embodiment to thereby complete an obvious circuit for relay 520 which would close contact 521 to energize the stepping magnet M–1' of rotary switch RS–1'. Rotary switch RS–1' is similar to rotary switch RS–1 and the ground on leads A' and B' would be applied through the first contacts of RS–1A' and the first contact of RS–1B' respectively of rotary switch RS–1' to the grids of tubes GA and GB respectively and thereby cause these tubes to operate. Operation of these tubes raises their cathode potential to a value of —25 volts.

When relay 510 operated as previously described, the ground was placed on conductor 553 to operate relay 610 in a manner similar to the operation of relay 310. Relay 610 operates and closes contacts corresponding to the contacts closed by relay 310 to thereby operate relay 620 corresponding to relay 320 and connect the anode power supply of tubes S–1', S–2', S–4' and S–8'. Relay 620 opens contacts 620A (corresponding to contact 320A mentioned previously) to remove ground from the hold conductor for no purpose at this time as a slow to release relay in the sender control circuit connected to the hold conductor and contact 620A is held operated by another grid as the operator has not operated her disconnect key. Relay 620 on operating connects the grids of tubes S–1'—S–8' to the first contact of the various levels of rotary switch RS–2' for thereby raising the grid potential of tubes S–1' and S–2' to a value of approximately —25 volts and cause these tubes to operate. In the meantime, of course, the operator might have released her digit key to cause release of relay 520 which in turn would open contact 521 and deenergize M–1' and cause it to step RS–1' to its next contact so that she may register another digit. The operator after having completed the registration of digits might operate her disconnect key. This removes a holding ground from a slow to release relay (not shown) in the sender control circuit which relay however would be held operated by the ground placed on contact 620A. Contact 620A is only open for a short period as relay 620 releases shortly on the operation of relay 640 to be described. This period is of insufficient duration to cause the restoration of the slow to release relay and the sender control circuit will continue to be held until all digits are sent.

The firing of the tube S–1' extinguishes tube X' and firing of tube S–2' extinguishes tube Y' thus setting the count at a value of three so that nine pulses will be sent before the count reaches twelve and the pulsing circuit halted. Firing of tube S–1' and S–2' operates relay 640 in a manner corresponding to relay 340 and which prepares a circuit for operating the pulsing relays 650, 655 and 660 and releases relay 620 to start the pulsing. The pulsing circuit operates as previously described and closes contacts 662 to cause condenser 664 to discharge and raise the grid potential of tube X' from —125 volts to ground potential and cause tube X' to fire. Tube X' on firing extinguishes tube S–1' due to the capacitance coupling in their cathode circuit. Extinguishing of tube S–1' due to the rise of its cathode potential raises the grid potential of tube Y' and it fires extinguishing tube S–2'. Extinguishing of tube S–2' raises the grid potential of S–4' and causes it to operate to thereby extinguish tube Z'. This advances the count from three to four and the next time relay 660 closes contacts 662, condenser 664 will again discharge and cause tube S–1' to now operate and extinguish tube X'. This raises the count to five and is equivalent so far to sending two pulses over the line at contacts 663. On the next pulse X' will be operated on the discharging of condenser 664 to in turn extinguish tube S–1' which in turn will operate tube S–2' which will now extinguish tube Y' to thus raise the count to six. On the count of seven corresponding to the fourth pulse condenser 664 on discharging will operate tube S–1' and cause tube X' to extinguish. The fifth pulse corresponding to the count of eight will result in the operation of tube X' which will in turn extinguish tube S–1' and cause tube Y' to operate. Tube Y' on operating will extinguish tube S–2' and operate tube Z'. Tube Z' on operating extinguishes tube S–4' and causes tube S–8' to operate. Operation of S–8' raises the grid voltage of GS to a value somewhat below the striking point, thereby preparing it for operation as described subsequently. The count now advances to nine corresponding to the sixth pulse which on the discharge of condenser 664 now operates tube S–1' and extinguishes tube X'. Count ten corresponding to the seventh pulse, discharges condenser 664 to operate tube X' and tube S–2'. Tube S–2' on operating extinguishes tube Y'. On the count of eleven corresponding to the eighth pulse, tube S–1' will be operated and tube X' will be extinguished. On the count of twelve corresponding to the ninth pulse tube X' will again be operated and again extinguish tube S–1' and again operate tube Y'. Tube Y' on operating will now extinguish tube S–2' and operate tube S–4' which will extinguish tube Z'. Simultaneously with the extinguishment of tube Z' the grid potential of tube GS' will be raised so that tube GS' will operate and cause the operation of relay 670 corresponding to relay 370. Relay 670 on operating will operate relay 680 in the same manner as relay 380 operated. Relay 680 on operating connects the +50 volts supply to the cathode of the register tubes at contacts 687—690 and thereby causes any operated ones to extinguish. Contacts 694 on opening breaks the anode circuits of all the counting tubes and they are all deionized. At contacts 686 it opens the circuit to relay 610 which releases and in turn opens the circuit to relay 620 which also releases. Relay 610 on releasing also opens another point in the anode circuit of tubes S–1', S–2', S–4' and S–8' at contacts 612. At contacts 681 the +25 volts supply to the anode of tube GP' is connected and at contacts 683 the —125 volts supply from the grid of tube GP' is removed. Condenser 696 charges from the +25 volts supply at a rate determined by the desired duration of the inter-digital pause and when the voltage across 696 reaches the striking potential of tube GP', tube GP' operates and causes relay 690 in its anode circuit to also operate. Relay 690 on operating sends ground to stepping magnet M–2' of rotary switch RS–2' and energizes it similarly to M–2 of rotary switch RS–2. Opening of contacts 691 breaks the anode circuit of tube GS' causing it to extinguish and release relay 670 which in turn causes it to release relay 680. Relay 680 on releasing opens contacts 681, breaks the anode circuit of tube GP' and restores the power supply to tube X', Y' and Z'. Extinguishing of tube GP' causes relay 690 to release to in turn break the circuit of M–2' of rotary switch RS–2'. M–2' of rotary switch RS–2' now deenergizes and on deenergization steps the switch to its next contact so that the process may be repeated for the next number registered.

After each digit is sent, relay 680 releases, relay 610 is reoperated to prepare a circuit for relay 620 which reoperates when relay 690 releases. Relay 620 on operating opens contacts 620A. In the event the operator did not register as many digits as there are contacts on the rotary switches or she desired to disassociate her key set from the sender she would have operated her disconnect key. This as described would remove a holding ground from a slow to release relay in the sender control circuit. This relay will not release if relay 640 is operated by one of the counterpart tubes as operation of relay 640 causes the relay 620 before the slow to release relay can restore. If however no further digits have been registered or the rotary switch has been stepped to its home position relay 640 will not be operated and relay 620 will remain operated to thereby cause the release of the slow to release relay which in turn will disassociate the sender control circuit from the impulse sender in any well known manner to in turn cause the release of relay 510. Relay 510 on releasing causes relay 610 and 620 to restore. Relay 510 on releasing also completes alternate stepping circuits for RS–1′ and RS–2′ through their respective off-normal switch if they are not in their home position so that they will be stepped to their respective home positions.

Thus having completely described the several embodiments of my invention it will be understood that my invention is in no way limited to the embodiments described in this application, but may be applied with or without change to many different and useful devices.

What is claimed is:

1. In an impulse sender, a group of electron tubes connected in a counting arrangement, means for energizing certain tubes in said group to register a digit in accordance with a predetermined code, a pulsing means, operating circuits for each of said certain tubes, a relay in said operating circuits operated on energization of any of said certain tubes, means operated by the operation of said relay for operating said pulsing means to thereby cause said tubes in said counting arrangement to count the number of pulses, and means operated by said tubes of said counting arrangement when a number of pulses corresponding to said registered digit have been counted for halting said pulsing means.

2. A combination such as claimed in claim 1, in which said first means has means for automatically energizing said certain tubes subsequent to a counting so as to register a digit after each counting whereby a series of digits are automatically registered and counted in sequence.

3. A combination such as claimed in claim 1, in which said first means comprises a series of electronic tubes, each of said tubes being assigned an individually corresponding digital value whereby the energization thereof registers a corresponding digit.

4. In an impulse sender, a source of potential, a plurality of condensers individually corresponding to a different digital value, selecting means operated in accordance with a desired digit for connecting said source of potential to the condensers whose corresponding digital value corresponds to said desired digit for charging said condensers, a plurality of tubes, means for energizing certain of said tubes, another plurality of tubes, each tube of said other plurality of tubes associated with a particular condenser and energized if said associated condenser is charged, a pulse generator, means operated by the energization of any of said second plurality of tubes for operating said pulse generator to thereby energize said tubes of both pluralities for halting said pulse generator after a predetermined number of pulses corresponding to said desired digit have been sent.

5. In an impulse sender, a plurality of condensers, each corresponding to a different digital value, a means for marking different ones of said condensers in accordance with different digits, a plurality of electronic valves, certain of said valves individually associated with corresponding ones of said condensers, said condensers when marked causing the energization of the individually associated valve, a pulse generator, means operated by any of said energized valves for operating said pulse generator, and means controlled by said pulse generator for rendering said valves effective for counting the number of pulses emanating from said pulse generator.

6. In an impulse sender such as described in claim 5, other pluralities of condensers corresponding to the first plurality, a switch having contacts for associating said marking means sequentially with each plurality of condensers to thereby sequentially mark condensers in each plurality to register a series of digits, and other means operated after said valves have counted the number of pulses as determined by the marking on a plurality of condensers for associating said certain valves with a succeeding plurality of condensers.

7. An electronic keysender comprising a plurality of groups of register capacitors, an electronic counting chain, first means operated to charge capacitors in each of said groups sequentially to register a series of digit values therein, transfer means operated to sequentially set said counting chain to the count corresponding to the digit values registered in said groups of capacitors, said capacitors each arranged with respect to said first means and said transfer means so as to prevent the alteration of a charge thereon except when said first means and said transfer means are operated, a pulse generator, means operated on each setting of said chain for operating said pulse generator, an output circuit operated by said operated pulse generator to deliver pulses to advance said counting chain one count for each pulse, and means operated by the counting chain to disable said pulse generator when the count is advanced to a predetermined value.

8. For use in an impulse sender, a group of electronic valves connected in a counting arrangement, groups of condensers, means for sequentially marking each group of condensers in accordance with a predetermined code to thereby register successive digits therein, energizing means operated for energizing certain valves in said arrangement in accordance with the marking of a group of condensers said condensers each arranged so as to retain a marking unaltered until said certain valves are energized in accordance therewith, a pulsing means operated for providing pulses when said valves are energized, means operated by said pulsing means to cause said valves in said counting arrangement to count the number of pulses, and means operated by said valves when the number of pulses counted thereby corresponds to a registered digit for halting said pulsing means and for operating said energizing means for energizing valves in said group in accordance with the marking of a succeeding group of condensers.

9. For use in an impulse sender, a means marked to sequentially register a series of digits, a plurality of space discharge devices, certain of said devices associated with said means and automatically energized by said means in accordance with the first of said registered digits on the registration of said first digit, a pulsing means, a common source of operating potential for enabling the energization of said certain devices, means connected between said common source of potential and said certain devices and operated by any of said energized devices, means operated by said last operated means for operating said pulsing means, others of said devices energized by said pulsing means and cooperating with said first devices to thereby count the number of pulses emanating from said pulsing means, means operated by said tubes when said count reaches a value corresponding to the first of said digits for halting the operation of said pulsing means and sequentially associating said certain devices with said first means for thereafter causing said pulsing means to operate in accordance with another of said registered digits.

10. An impulse sender comprising a keyset operable to different positions corresponding to different digits, a registration means, a stepping switch having contacts for associating said keyset with said registration means to register a first digit on operation of said keyset, an electronic counting circuit, means for automatically associating said counting circuit with said registration means for setting said counting circuit at a position corresponding to said digit on the registration of said digit, an impulsing means operated when said counting circuit is set for advancing said counting circuit to a predetermined position to thereby count a number of pulses corresponding to said digit, and means for advancing said stepping switch after registration of a digit for enabling the registration of a succeeding digit in said registration means.

11. A sender such as claimed in claim 10 in which said registration means comprises groups of condensers, each condenser associated with a different contact of said switch, and means including said switch for charging condensers individually corresponding to a different digit value of each group of condensers on successive operation of said keyset to thereby enable the registration of a series of digits.

12. A sender such as claimed in claim 10 in which said registration means comprises groups of electronic valves, each valve associated with a different contact of said switch, and means including said switch for energizing valves individually corresponding to a different digit value of each group of valves on successive operation of said keyset to thereby enable the registration of a series of digits.

13. A sender such as claimed in claim 10, in which said means for associating said registration means includes a stepping switch operable on said counting circuit reaching said predetermined position for associating said counting circuit with said registration means to cause said counting circuit to be set in accordance with another digit registered in said registration means.

14. For use in an impulse sender, a keyset having four marking leads associated therewith, a registration means, contacts in said keyset operable for marking said leads individually corresponding to operated ones of said contacts to register a digit in said registration means corresponding to said operated contacts, an electronic counting circuit, and means for transferring a registered digit from said registration means to set said counting circuit according to a marking, said counting circuit arranged to count to a particular number to thereby enable the registration of any digit from one to ten over said marking leads from said keyset by the simultaneous operation of no more than two contacts.

15. In an impulse sender, a group of electronic valves connected in a counting arrangement, means for controlling certain valves of said group to register a digit from one to ten in accordance with the predetermined code of twelve minus the digit, a pulsing means, means operated by any of said certain valves for operating said pulsing means to thereby cause said valves in said counting arrangement to count the number of pulses, and means operated by said valves on reaching the count of twelve for halting the operation of said pulsing means to thereby send a number of pulses corresponding to the digit.

16. For use with an impulse transmitting arrangement, means for sequentially storing a series of digits, an electronic counting circuit, associating means automatically operated for associating said electronic counting circuit with said storing means to register a digit in said counting circuit immediately on the storing of a first digit to control said impulse transmitting arrangement to transmit a number of impulses corresponding to said first digit, and means for controlling said associating means when a digit is registered and a number of impulses corresponding thereto are transmitted for registering another digit in said counting circuit.

17. A combination such as claimed in claim 16, in which said means for storing digits includes a plurality of groups of electronic valves, each group arranged to be conditioned in a manner individually corresponding to the digit stored therein.

18. For use with an impulse transmitting arrangement, a plurality of capacitor storage groups whereby a digit is stored in each group by marking a capacitor in each group corresponding to the stored digit, an electronic counting circuit, and means for successively associating said groups of storage capacitors with said counting circuit whereby said counting circuit controls said impulse transmitting arrangement to successively transmit a digit corresponding to that stored in each capacitor group, said means arranged with respect to said capacitors and said counting chain for effectively preventing the alteration of a marking on any of said capacitors until said counting circuit is associated therewith.

19. In a combination such as claimed in claim 18, means for controlling said associating means to associate a first group of storage capacitors with said counting circuit immediately on the storage of a digit in said first group of storage capacitors.

References Cited in the file of this patent

UNITED STATES PATENTS

| | | |
|---|---|---|
| 2,268,859 | Dohle | Jan. 6, 1942 |
| 2,576,099 | Bray et al. | Nov. 27, 1951 |
| 2,693,593 | Crosman | Nov. 2, 1954 |